United States Patent

Bitler

[15] 3,696,421

[45] Oct. 3, 1972

[54] SPACE DIVERSITY PHASED ARRAY RETRANSMISSION SYSTEM USING TIME DIVISION

[72] Inventor: Jesse S. Bitler, Howell Township, Monmouth County, N.J.

[73] Assignee: Bell Telephone Laboratories, Incorporated, Murray Hill, N.J.

[22] Filed: June 6, 1969

[21] Appl. No.: 831,132

[52] U.S. Cl...........343/100 TD, 343/6.5 R, 343/178, 325/14

[51] Int. Cl...............................................G01s 9/56

[58] Field of Search........343/100 TD, 6.5, 178, 179, 343/117 A; 325/14

[56] References Cited

UNITED STATES PATENTS

| | | | |
|---|---|---|---|
| 3,144,645 | 8/1964 | McIver et al. | 343/6.5 |
| 3,175,216 | 3/1965 | Enloe | 343/100 TD |
| 3,273,151 | 9/1966 | Cutler et al | 343/100 TD |

OTHER PUBLICATIONS

IEEE Transactions, M. I. Skolnik et al.; " Self-Phasing Array Antennas," 5/18/1964; pp. 142- 149

*Primary Examiner*—Richard A. Farley
*Assistant Examiner*—R. Kinberg
*Attorney*—R. J. Guenther and E. W. Adams, Jr.

[57] ABSTRACT

An adaptive retransmission station operates at a single reception and transmission frequency by use of time division while full duplex operation is provided by appropriate sampling. This scheme is especially well suited to mobile radio systems operating at microwave frequencies in populated areas. A timing sequence is established with three individual time slots for transmission of samples of a phase reference signal from base to remote, an intelligence bearing signal from base to remote, and a generated return intelligence bearing signal from remote to base. Time dedicated to transit delay is provided after transmission of the intelligence signals from both the base and remote stations.

10 Claims, 3 Drawing Figures

INVENTOR
J. S. BITLER
BY
ATTORNEY

SPACE DIVERSITY PHASED ARRAY RETRANSMISSION SYSTEM USING TIME DIVISION

Background of the Invention

This invention relates to communication systems, and more particularly to space diversity phased array systems for use in highly dispersive media. Specifically, the invention uses time division of reception and transmission and provides retransmission having adaptive directivity.

In retransmission systems a space diversity phased array is employed to improve transmission quality, especially by reducing the effects of fading which may be due in part to multipaths experienced by the transmission between stations. Each element of the array receives from an originating station an intelligence signal and a pilot signal which may be either a part of or independent of the intelligence, and commonly, predetection combining is employed to overcome multipath phase distortion of the received intelligence. The return intelligence is transmitted by each element of the array under control of the pilot which contains phase information corresponding to the phase angle of the reception of that element. The phase information is used to control the phase of the transmission hereinafter referred to as retransmission from that element. Most conventionally, the complex conjugate phase of the pilot received by each element is applied to a generated signal and the combined outputs of the elements of the array produce a total retransmission directed toward the apparent location of the originating station, but another angle may be used so as to direct the retransmission to some point other than the originating station. In order to provide useful directivity, the phase information of the received pilot must be appropriate to the retransmission and hence the frequencies of the two must be within a phase coherent bandwidth.

A satellite system using retransmission is disclosed, for instance, in U.S. Pat. No. 3,273,151 issued to C. C. Cutler et al., Sept. 13, 1966. The incoming pilot and retransmitted intelligence carrier are widely separated in frequency but the transmission medium is such that the phase coherent bandwidth is broad enough to accommodate the separation. In other environments, such as mobile radios operating in urban areas at microwave frequencies, the transmission experiences a highly dispersive medium and hence, a very narrow phase coherent bandwidth. Such an environment requires that the frequencies of the incoming signal containing the phase information and the retransmitted intelligence be within this narrow band, the width of which is only about 100 KHz for frequencies on the order of 10 GHz. Continuous detection of the pilot in the presence of the retransmission at a nearly identical frequency presents a severe isolation problem. This difficulty is magnified immensely when, as in a mobile radio application, the incoming pilot is very weak relative to the retransmission, and the phase information is apt to be irretrievably lost as a result of the pilot being swamped by the leakage of the retransmission.

Summary of the Invention

It is an object of this invention to provide for adaptive retransmission in highly dispersive media.

It is a further object to provide a retransmission station capable of operating with a weak incoming pilot signal and a strong retransmission signal of nearly identical frequencies.

In accordance with the invention time division of reception and transmission at a phased array retransmitting station is provided by a timing sequence having three individual time slots containing respectively samples of a phase reference signal transmitted from an originating station, an original intelligence signal transmitted from the originating station, and a retransmitted return intelligence signal transmitted from the retransmitting station. Time is dedicated to transit delay after transmission of both intelligence signals. Appropriate sampling provides full duplex operation. Adaptive directivity of retransmission in both directions may, of course, be produced by duplicating the array of phasing control apparatus at the originating station and transmitting a return pilot from the retransmitting station.

Detailed Description

Figure 2:
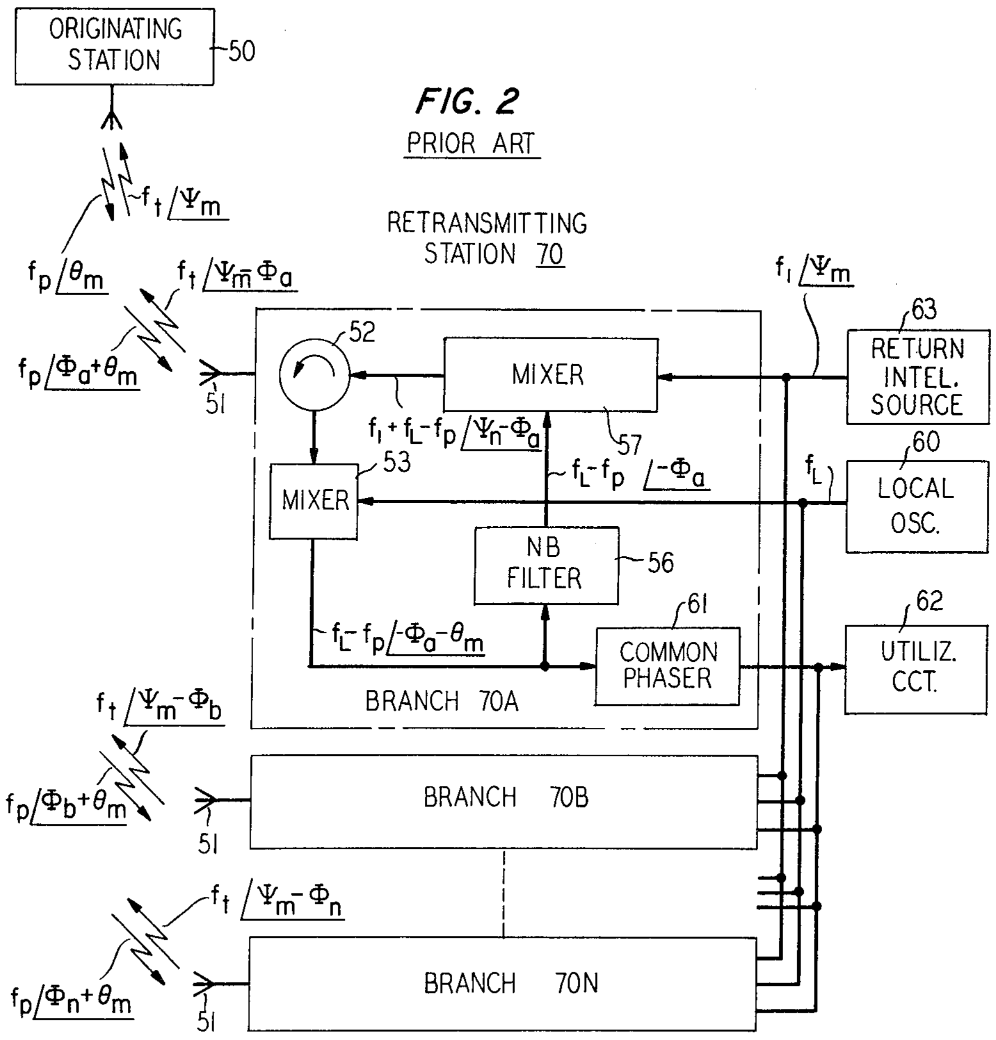
FIG. 2 PRIOR ART
FIG. 2 is a block diagram of a frequency division retransmission system representative of the prior art.

The retransmission system disclosed in FIG. 2 is an example of a conventional system employing widely separated pilot and retransmission carrier frequencies, $f_p$ and $f_t$, respectively. For simplicity the intelligence modulation from originating station 50 is indicated as phase angle $\theta_m$ on pilot frequency $f_p$ which is radiated by station 50, but the intelligence may, of course, also be transmitted independently of the pilot tone. An individual antenna 51 in each branch 70A through 70N of retransmitting station 70 receives the pilot $f_p$. Phase shift in the transmission medium gives rise to an additional phase angle and the space diversity of antennas 51 results in the reception of a distinct phase angle $\Phi$ in each branch designated for example $\Phi_a$ in branch 70A. With reference to branch 70A which is identical to all other branches, the reception is fed through an isolating duplexer represented by circulator 52 to mixer 53 where it is mixed with a signal of frequency $f_L$ from common local oscillator 60. Assuming $f_L$ is greater than $f_p$ and ignoring the constant phase angle of the signal from oscillator 60, the resultant difference signal has a translated frequency $f_L - f_p$ and a phase angle $-\Phi_a - \theta_m$ which is designated $f_L - f_p \underline{|-\Phi_a - \Phi_m}$. Common phaser 61 which may be any conventional phasing circuit, such as in the receiver disclosed in U.S. Pat. No. 2,683,213 issued July 6, 1954 to C. W. Earp splits the signal from mixer 53 into two portions and recombines the portions to eliminate the phase $\Phi_a$ while retaining $\theta_m$. This reduces the reception in each branch to a common phase and permits predetection combining. Utilization circuit 62 detects the intelligence modulation $\theta_m$.

The translated signal from mixer 53 is also passed to retransmission mixer 57 after being filtered by narrow band filter 56 which removes the relatively broadband modulation $\theta_m$. Return intelligence produced by source 63 and designated $f_l \angle \Psi_m$ is modulated on the translated pilot $f_L - f_p \angle -\Phi_a$ by mixer 57 and the sum product forms the retransmission signal $f_l + f_L - f_p \angle \Psi_m - \Phi_a$ which is defined as $f_t \angle \Psi_m - \Phi_a$. The retransmission signal is applied through circulator 52 to antenna 51. Each identical branch 70A through 70N thus radiates a retransmission signal having the opposite phase angle $-\Phi$ to that of the received pilot in that branch of the array. This adjustment of phase in each branch provides adaptive directivity of the retransmission as is well known in the art.

If the frequencies of reception $f_p$ and retransmission $f_t$ are sufficiently separated so that conventional filtering provides the needed isolation, the system will operate properly, but where a narrow phase coherence bandwidth requires the use of signals very close in frequency, isolation is practically impossible. The strong retransmission appears in the common portion of the retransmitting station and leaks into the reception path swamping the pilot signal. In fact, the retransmission leakage of $f_t$ is translated to IF by mixer 53 producing a signal of frequency $f_L - f_t$ which mixes with the generated signal $f_l$ in mixer 57 to produce an additional and undesired upper sideband of frequency $f_l + f_L - f_t$ in addition to the desired frequency $f_t$ and since $f_t$ was defined as $f_l + f_L - f_p$ the undesired sideband reduces to $f_p$. Because the leakage is strong this undesired product is a strong signal at the identical frequency of the incoming pilot and, of course, destroys the capability of detecting the weak incoming pilot.

The conventional system also requires means for removing the received modulation from the pilot before it can be used to control the phase of the retransmission. This is illustrated as a narrow band filter 56, but such a simple device functions effectively only where the Doppler shift i insignificant. For high frequency mobile radio applications that may not always be the case.

Figure 1:
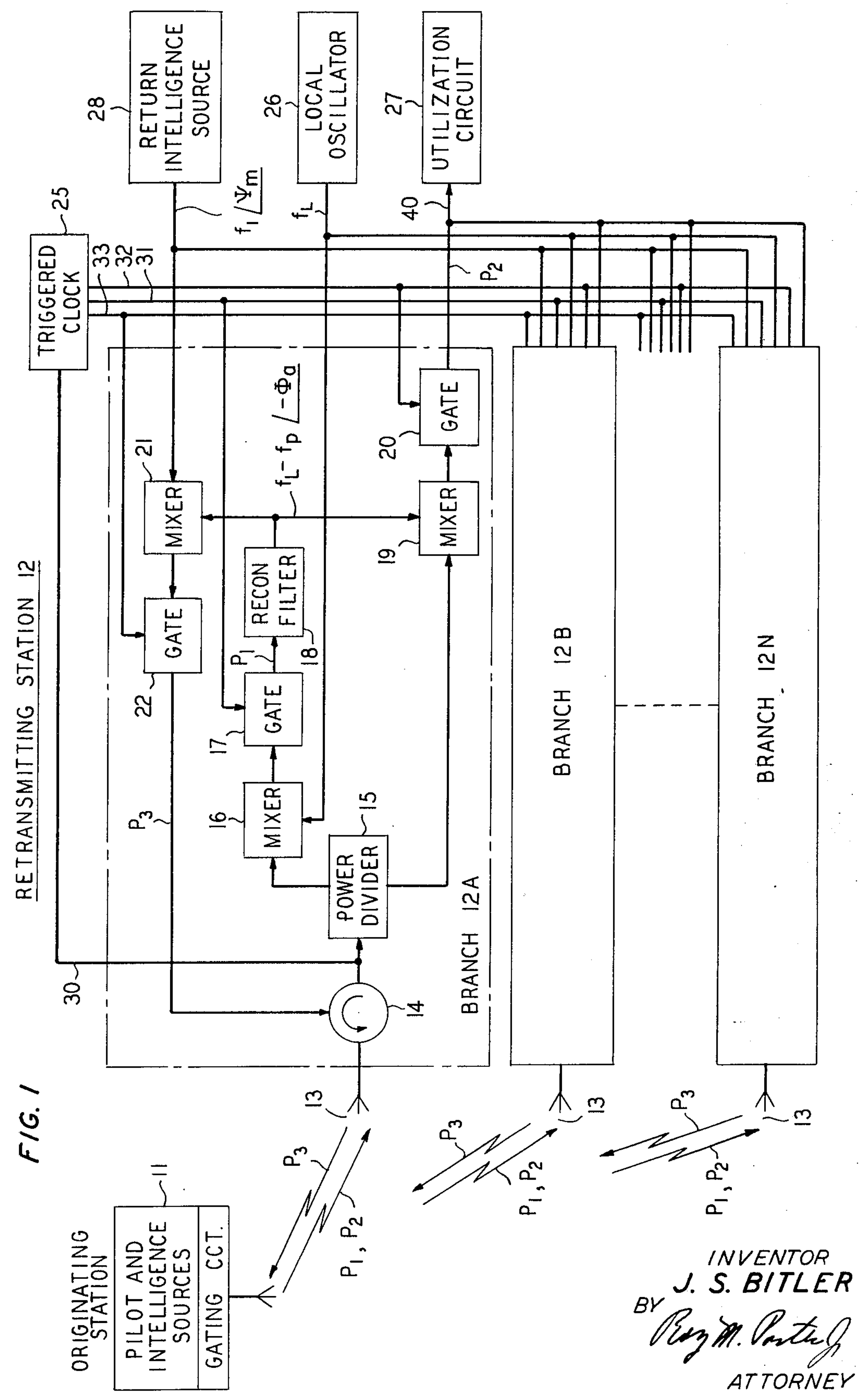
FIG. 1 is a block diagram of a time division retransmission system in accordance with the invention.

FIG. 1 illustrates a time division system in accordance with the invention in which conventional filters and amplifiers have been omitted for simplicity. The system is particularly well suited to an environment of narrow phase coherent bandwidth such as is provided by the highly dispersive media of a microwave mobile radio system in an urban area. Originating station 11 is assumed to be the base station having a single antenna and hence no adaptive retransmission capability. Retransmitting station 12 comprises identical branches 12A through 12N and is assumed to be the remote station, but either station or both may be mobile. Also the phased array and retransmission circuits may be at either location and in addition to retransmission in a single direction as illustrated, it may be provided in both directions by merely transmitting a phase reference signal or pilot in both directions and duplicating the antenna array and phase control mechanisms.

Isolation of the received and retransmitted signals is provided by time division. According to conventional sampling theory which is fully described in *An Introduction to the Principles of Communication Theory*, by John S. Hancock, 1961, it is well known from Theorem 2 in Section 1.6 on page 19 that a band limited signal must be sampled at approximately twice the rate of its bandwidth in order to contain sufficient information to faithfully reconstruct the original wave function. Having met this requirement the samples may be used to reconstruct the original waveform by simply passing them through an ideal bandpass filter having a pass band equal to the bandwidth of the original signal.

Station 11 produces a continuous pilot or phase reference signal and a continuous original intelligence signal. Conventional gating circuitry samples these signals and station 11 transmits two consecutive segments of transmission, which will be called pulses because of their relatively short durations. A segment of the pilot signal, designated pulse $P_1$ is followed by pulse $P_2$, which is a segment of an intelligence bearing signal. The frequency and phase designations are assumed to be identical with those in the prior art embodiment of FIG. 2 and the interaction of frequencies and phase are similar except that time division circuitry is provided since the incoming frequency and retransmission frequency are assumed to be substantially identical. The system will, of course, also operate where the frequencies are different. In the following description all of the sampling rates are assumed to conform to the above-described sampling theorem in order that faithful reconstruction results thus providing full duplex operation.

Figure 3:
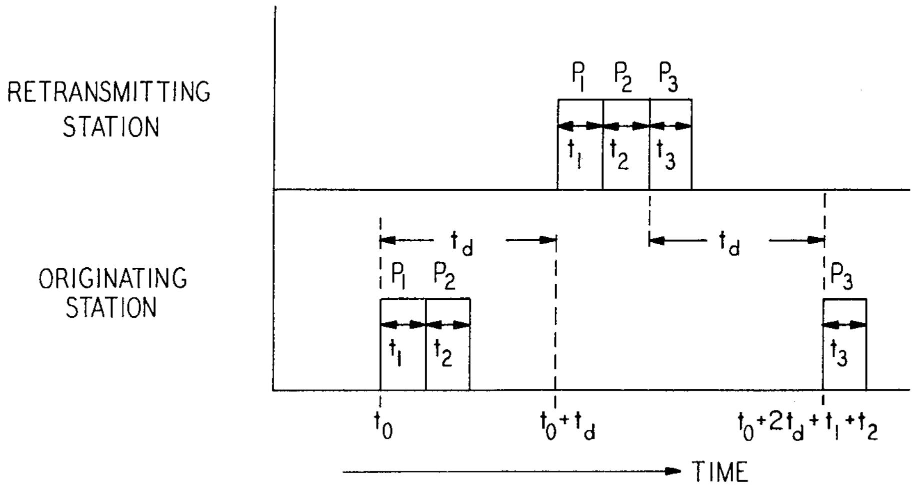
FIG. 3 is a graphical representation of the timing sequence at the originating and retransmitting stations of the system in accordance with the invention.

Referring to FIG. 3 in conjunction with FIG. 1, at a time $t_o$, the $P_1$ sample of pilot tone $f_p \angle O$ is transmitted from station 11 for a discrete time period of a duration $t_1$ and is followed immediately by transmission of $P_2$, a sample of intelligence $f_p \angle \theta_m$, for a discrete time period of a duration $t_2$. After a transit delay $t_d$ the leading edge of $P_1$ is received at station 12 by each identical branch 12A through 12N. It has been assumed that antennas 13 in each branch are spatially displaced sufficiently to provide phase difference but not significantly different times of arrival.

The incoming pulses received by antenna 13 in each branch pass through an isolating duplexer such as circulator 14. The leading edge of $P_1$ arriving at $t_o + t_d$ will set triggered clock 25. Lead 30 is indicated as sampling the received signal in branch 12A but as each branch receives the input at substantially the same time, any branch or any number of branches could be used to provide the indication of the leading edge. A multiple connection would improve the efficiency of reset as the signal-to-noise ratio would be increased. After having been set, clock 25 produces enabling signals on leads 31, 32 and 33 to enable gates 17, 20 and 22 at times $t_o + t_d$; $t_o + t_d + t_1$, and $t_o + t_d + t_1 + t_2$ for durations of $t_1$, $t_2$, and $t_3$, respectively.

The pulses of signals $f_p \angle \Phi$ and $f_p \angle \Phi + \theta_m$, where $\Phi$ is designated $\Phi_a$ in branch 12A, for example, are split into two portions by power divider 15. One portion is passed into mixer 16 where it is mixed with the signal $f_L$ from local oscillator 26. It is assumed that $f_L$ is greater than $f_P$ and the constant phase of $f_L$ is ignored. Difference products $f_L - f_p \angle -\Phi_a$ and $f_L - f_p \angle -\Phi_a - \theta_m$ result from $P_1$ and $P_2$, respectively. Gate 17, enables by a signal from clock 25 on lead 31, permits the translated pilot signal $f_L - f_p \angle -\Phi_a$ to pass to reconstruction filter 18 by blocking the passage of $P_2$ as gate 17 is enabled for only a duration $t_1$. Filter 18, which may be an appropriate phase locked loop, essentially stores the received phase information by creating a continuous reconstructed pilot from the samples when its cutoff frequencies meet the sampling criteria set forth above.

The resultant continuous output $f_L - f_p \angle -\Phi_a$ of filter 18 is a pilot signal translated to IF which contains the conjugate phase angle associated with input of the specific branch 12A of station 12. The translated pilot is applied to mixer 19 along with the other portion of the input from divider 15, and mixer 19 performs the cophasing function required for predetection combining. The sum product of mixer 19 is $f_L$ without a phase angle followed by $f_L \angle \theta_m$. This is applied to gate 20 which is enabled as described above during the time $t_2$, thus passing only the signal derived from incoming pulse $P_2$ which contains the intelligence modulation $\theta_m$. In this manner each branch 12A through 12N produces modulation at a common phase at point 40 where it is combined. It is detected by utilization circuit 27 which contains a conventional reconstruction filter similar to filter 18. For purposes of the invention, gate 20 may be omitted as no modulation exists at other times on the output of mixer 19, but it has been found that the signal-to-noise ratio is substantially improved by passing to utilization circuit 27 only the desired sample derived from pulse $P_2$.

The output of filter 18 is also used as a means of adjusting the phase of the retransmission. Return intelligence generated by source 28 and designated $f_i \angle \Psi_m$ is applied to each branch in which it is mixed with the reconstructed and translated pilot in retransmission mixer 21. The sum product of mixer 21 is $f_i + f_L - f_p \angle \Psi_m - \Phi_a$ and $f_i$ is selected so that $f_i + f_L - f_p = f_t$ the retransmission frequency which may, of course, be the same as $f_p$. The continuous retransmission produced by mixer 21 in each branch has a distinct conjugate phase angle as required for adaptive directivity. Gate 22 enabled at time $t_o + t_d + t_1 + t_2$ for a duration $t_3$ acts as the sampling circuit for the retransmission and results in a pulse $P_3$ which passes through circulator 14 to antennas 13 where it is radiated. This is duplicated in each branch of the array with the appropriate phase angles. Pulse $P_3$ arrives at station 11 at time $t_o + 2t_d + t_1 + t_2$, and reconstruction is performed in a conventional manner.

The time division system of the present invention eliminates the problem of leakage and swamping by simply eliminating the co-existence of incoming and outgoing signals in any common portion of the circuit at any one time. The required sampling techniques do not degrade the service if the sampling requirements are met, but the system is range limited. The gating circuit of station 11 may be arranged to transmit a new cycle of $P_1$ followed by $P_2$ immediately after receiving $P_3$. However, with increasing separation between stations 11 and 12 the transit delay increases and eventually the sampling rate will become insufficient to meet the sampling requirements. An alternative arrangement would allow station 11 to begin transmitting the new cycles at fixed intervals after previous transmissions without regard to reception, but with this arrangement there is some separation at which station 11 will be transmitting while the retransmitted pulse $P_3$ is arriving and this will, of course, cause a loss of the return intelligence.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:

1. A communication system comprising originating means for transmitting exclusively in a first discrete time period a phase reference signal and for transmitting exclusively in a second discrete time period an original intelligence signal, a space diversity array of antenna elements for receiving said phase reference and said original intelligence signals, a source for producing a return intelligence signal, a plurality of retransmission means each associated with one of said elements of said array for adjusting the phase of said return intelligence signal to the conjugate phase of said phase reference signal received by said one element and for transmitting via said one element said adjusted return intelligence signal exclusively in a third discrete time period.

2. A communication system as claimed in claim 1 further comprising a plurality of phasing means each associated with one of said elements of said array for bringing to a common phase each of said original intelligence signals received by each of said elements, means for combining said commonly phased signals, and utilization means for detecting said intelligence from the combined signals.

3. A communication system as claimed in claim 1 wherein said means for transmitting said phase reference signal and said means for retransmitting said return intelligence signal produce signals of substantially the same frequency.

4. A communication system as claimed in claim 1 wherein said originating means includes gating circuits for sampling a continuous phase reference signal and a continuous intelligence signal and for sampling in said first and said second discrete time periods segments of said continuous phase reference and intelligence signals respectively, and said retransmission means includes a retransmission gating circuit for sampling said continuous return intelligence signal and for passing in said third discrete time period segments of said continuous retransmission signal and a reference gating circuit for sampling the received signals and exclusively passing said phase reference signal.

5. A communication system as claimed in claim 4 further comprising an intelligence gating circuit for sampling the received signals and exclusively passing said original intelligence signal.

6. A communication system as claimed in claim 4 wherein said gating circuits included in said retransmission means are enabled by a clock which is reset by the arrival of said phase reference signal.

7. A communication system as claimed in claim 4 wherein said retransmission means includes means for reconstructing a continuous phase reference signal from the received segments of said phase reference signal.

8. A communication system as claimed in claim 7 wherein said means for reconstructing a continuous phase reference signal is a phase lock loop.

9. A communication system comprising means for transmitting from an originating station a segment of a phase reference signal in one selected time slot, means for receiving at a retransmitting station said segment of a phase reference signal after a finite transit delay by a plurality of spatially separated antenna elements, means for reconstructing from each of the plurality of received segments associated with each of said elements a plurality of continuous phase reference signals, means for producing a return intelligence signal, means associated with each of said antenna elements for combining said plurality of continuous phase reference signals with portions of said return intelligence signal to produce generated signals having the phase opposite to that of the phase reference signal associated with that element, means for retransmitting said generated signals from each of said elements for another selected time slot separated from said one selected time slot by at least the combined times of transmission from said originating station and said transit delay.

10. A communication system having a base station and a remote station, said base station including means for transmitting a pilot signal and an information signal and means for receiving a generated signal, said remote station including a plurality of circuit loops each of said loops comprising means for receiving both said pilot and said information signals and for transmitting the generated signal, means for adjusting the phase of the generated signal so that it has the conjugate phase of the pilot signal received by that loop characterized in that said pilot, said information and said generated signals are all of the substantially identical frequency, said base station includes a first sequencing means for transmitting said pilot signal exclusively during a first discrete time slot and for transmitting said information signal exclusively during a second discrete time slot, and said remote station includes in each of said loops a second sequencing means for transmitting said generated signal exclusively during a third discrete time and means for storing phase information obtained from said received pilot signal for use in said third time slot.

* * * * *